Sept. 18, 1928.
J. B. HENDERSON
GUN SIGHT
Filed June 23, 1920
1,684,825
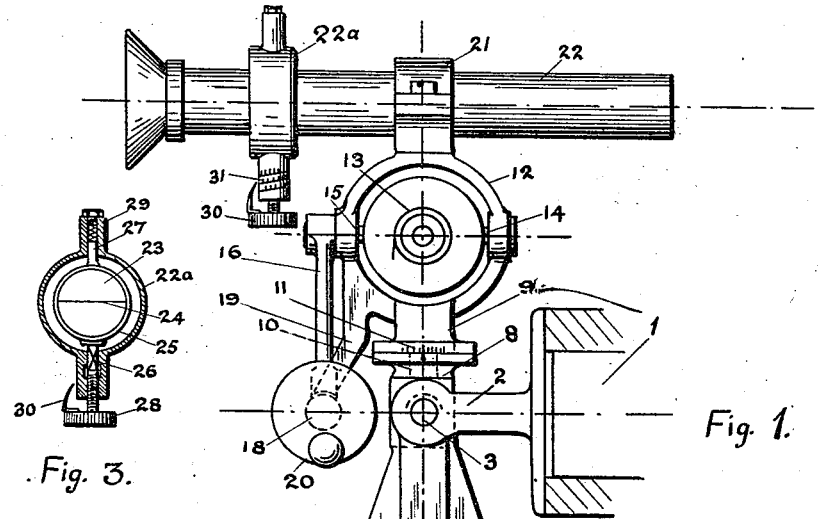
Fig. 1.
Fig. 3.
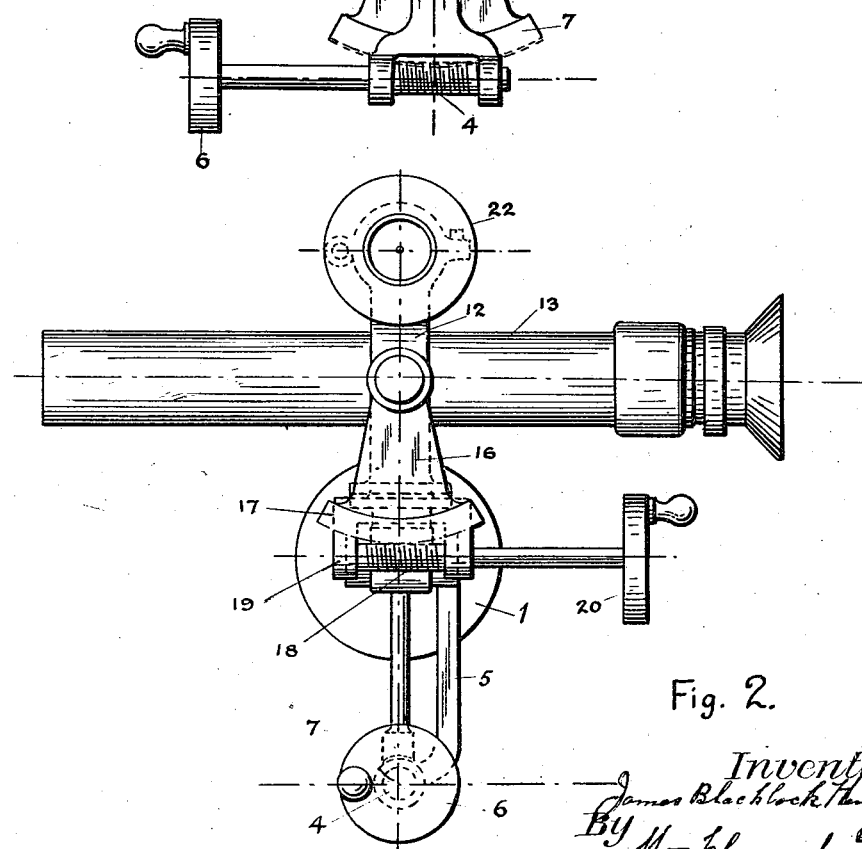
Fig. 2.
Inventor
James Blacklock Henderson
By Moakley and Gill
Attorneys Patented Sept. 18, 1928.

1,684,825

UNITED STATES PATENT OFFICE.

JAMES BLACKLOCK HENDERSON, OF LEE, ENGLAND.

GUN SIGHT.

Application filed June 23, 1920, Serial No. 391,188, and in Great Britain September 19, 1919.

This invention relates to improvements in methods of directing projectiles from guns, bomb-droppers and the like for use on board ship or other moving platforms upon which it is impossible to use a bubble tube to determine the vertical. In this invention I compensate the error in the trajectory due to angular motion of the platform round the line of sight to the target, by laying an auxiliary telescope which is attached to the main gun sight, upon the horizon or other distant object, the sight being mounted upon trunnions parallel to the axis of the gun and the cross-levelling adjustment being made by rotating the sight round this trunnion.

Figure 1 shows an elevation of the sight looking parallel to the axis of the gun;

Figure 2 shows a side elevation at right angles to Figure 1; and

Figure 3 is a vertical section through the focal plane of the cross-levelling telescope.

The sight is mounted upon the gun trunnion 1 upon a fork 2 upon which it is pivoted on a trunnion 3 which is parallel to the axis of the gun. The gun is turned about the trunnion 3 by a worm 4 carried by a bracket 5 which is attached to the fork 2, the worm 4 being turned by the hand wheel 6 and gearing with the worm sector 7, which is rigidly attached to the sight support 8 to which the trunnion 3 is attached. The sight stem or support 8 is made in two parts, the upper part 9 being pivoted on the lower part 8 upon a central pivot 10 shown dotted, the upper part 9 being turned about this pivot 10 to provide deflection in azimuth on the sight, a deflection scale 11 being graduated on the stem 9.

The stem 9 carries a ring 12 which supports the main sighting telescope 13 upon horizontal trunnions 14—15, this telescope being elevated by a crank 16 fitted with a worm sector 17, which is turned by the worm 18 carried by a bracket 19, which forms a projecting part of the ring 12. The worm is turned by the hand wheel 20, the motion of the hand wheel 20 being recorded on a range dial which is not shown in the diagram. The support 9 carries, above the ring 12, a telescope holder 21 which supports the telescope 22, which I call the "cross-levelling telescope". It is provided with a cross-wire in the focal plane and this cross-wire is laid upon the horizon by turning the hand wheel 6.

A section through the focal plane of the telescope 22 is shown in Figure 3, the graticule 23, having a cross-wire 24 engraved upon it, is carried in a ring 25 upon a vertical stem 26—27, the lower stem 26 being square in section to prevent the ring 25 turning in azimuth. The ring 25 is raised and lowered by means of a screw 28 and spring 29, and a pointer 30, attached to the milled head 28 indicates the motion upon a scale 31, which is called the "scale of drift".

The operation of the sight is as follows:—

The hand wheel 20 having been set to the given range the gun is elevated and trained by the gun layer in the usual manner until the telescope 13 is on the target. An auxiliary observer looking through the telescope 22 turns the hand wheel 6 until the telescope 22 is laid upon the horizon or upon any convenient object near the horizon. For example, in aircraft it might be laid upon a very distant low-lying cloud. I shall call the two observers A and B, A being the main gun layer. After B has brought the telescope 22 on to the horizon, A may find that his telescope is no longer on the target and he trains and elevates the gun so as to bring it on to the target again. The two observers working together, one on the horizon and the other on the target, automatically compensate the deflection of the trajectory which would otherwise be brought about by the angular motion of the platform around the line of sight to the target. The adjustment for drift is made by inclining the axis of collimation of the telescope 22 to the central line of the sight stem 8, which corresponds to the standard method of applying drift by varying the inclination of the plane of elevation of the sight to the axis of the gun trunnion.

I have described the invention as applied to a gun sight, but it is equally applicable to a director sight for controlling guns at a distance, the trunnion 1 being the main horizontal trunnion of the director sight.

I have also shown and described the sight 13 and 22 as being telescopic sights but it is to be understood that either or both of these might be of the open or other type.

Having now particularly described and ascertained the nature of my said invention and in what manner the same is to be performed, I declare that what I claim is:—

1. In a sighting apparatus for a gun mounted on an angularly moving platform, a sighting member adapted to bear a predetermined relation to a line between the gun and a distant object, a member connected to said sighting member and bearing a predetermined relation to the bore of the gun, and a continuously effective sighting member lying at a substantial angle to the first sighting member and connected to said members whereby they may be continuously maintained in a vertical plane as the platform moves to compensate for the effect of its angular movement.

2. In a sighting apparatus for a gun mounted on an angularly moving platform, a sighting member adapted to bear a predetermined relation to a line between the gun and a distant object, a member connected to said sighting member and bearing a predetermined relation to the bore of the gun, means for adjusting the members with respect to each other in accordance with the range adjustment of the gun, and means including an optical instrument connected to said members for continuously viewing a distant point at an angle to said line whereby one member may be continuously oscillated about the other as the platform moves to compensate for the effect of its angular movement.

3. In a sighting apparatus for a gun mounted on an angularly moving platform, a member adapted to bear a predetermined relation to a line between the gun and a target, a member connected to said member and bearing a predetermined relation to the bore of the gun, means for adjusting the members with respect to each other in accordance with the range adjustment of the gun, means included in said connection for adjusting the members with respect to each other in accordance with deflection and an optical instrument connected to said members for viewing continuously a distant point at an angle to the said line whereby one member may be continuously oscillated about the other as the platform moves to compensate for the effect of its angular movement.

4. In a sighting apparatus for a gun mounted on an angularly moving platform, a member parallel to the bore of the gun, a main sighting device connected to and rotatable about said member, an auxiliary sighting device connected to said main sighting device, means associated with the auxiliary sighting device for altering its axis of collimation relative to the axis of collimation of the main sighting device, and means whereby the main sighting device and the member parallel to the bore of the gun may be retained in a vertical plane by viewing a distant point through the auxiliary sighting device.

5. In a sighting apparatus for a gun mounted on an angularly moving platform, a member having a predetermined relation to the bore of the gun, a sighting device connected to the member for viewing a distant point, a second sighting device connected to the first sighting device for viewing a distant point at an angle to the line between the gun and the distant object, whereby the first sighting device and the member may be maintained in a vertical plane as the platform moves, and means associated with the second sighting device for correcting for the drift of the projectile of the gun.

6. In a sighting apparatus for a gun mounted on an angularly moving platform, a sighting device adapted to maintain a predetermined relation to a line between the gun and a distant target, a second sighting device connected to said first device for viewing a distant point at an angle to said line, means to maintain said first device substantially immovable as the platform moves by keeping said second device directed on said point, and means for introducing a drift correction by adjusting the relation between the axes of collimation of said devices.

7. In a sighting apparatus for a gun mounted on an angularly moving platform, a sighting device mounted substantially parallel to the vertical plane of the bore of the gun, a second sighting device connected at an angle to said device for viewing a distant object, means to maintain said first device substantially immovable by keeping said second device directed on said point, and means connected to the second sighting device for introducing drift corrections.

8. In combination with the trunnion of a gun, a support connected to said trunnion to pivot about an axis parallel to the bore of the gun, means for adjusting said support about said axis, a sighting device on said support having its line of sight in a plane passing through said axis, and a second sighting device mounted on said support having its line of sight at an angle to said axis.

Dated this 20th day of May, 1920.

JAMES BLACKLOCK HENDERSON.